United States Patent
Hagihara

(10) Patent No.: US 11,187,314 B2
(45) Date of Patent: Nov. 30, 2021

(54) GEAR DEVICE AND METHOD FOR ASSEMBLING GEAR DEVICE

(71) Applicant: ENPLAS CORPORATION, Saitama (JP)

(72) Inventor: Toru Hagihara, Saitama (JP)

(73) Assignee: ENPLAS CORPORATION, Saitama (JP)

(*) Notice: Subject to any disclaimer, the term of this patent is extended or adjusted under 35 U.S.C. 154(b) by 683 days.

(21) Appl. No.: 16/076,178

(22) PCT Filed: Jan. 12, 2017

(86) PCT No.: PCT/JP2017/000738
§ 371 (c)(1),
(2) Date: Aug. 7, 2018

(87) PCT Pub. No.: WO2017/138288
PCT Pub. Date: Aug. 17, 2017

(65) Prior Publication Data
US 2021/0190196 A1 Jun. 24, 2021

(30) Foreign Application Priority Data
Feb. 8, 2016 (JP) .............................. JP2016-021748

(51) Int. Cl.
*F16H 57/02* (2012.01)
*F16H 1/20* (2006.01)
(Continued)

(52) U.S. Cl.
CPC ............. *F16H 57/023* (2013.01); *F16H 1/22* (2013.01); *F16H 57/021* (2013.01);
(Continued)

(58) Field of Classification Search
CPC ... F16H 1/206; F16H 1/22; F16H 1/24; F16H 57/021; F16H 57/022; F16H 57/023;
(Continued)

(56) References Cited

U.S. PATENT DOCUMENTS 4,429,586 A * 2/1984 Dopfer .................... F16H 1/206
74/410
4,960,006 A * 10/1990 Moore .................... F01D 25/34
290/48
(Continued)

FOREIGN PATENT DOCUMENTS

JP          8-284677      10/1996
JP          2001-82587    3/2001
(Continued)

OTHER PUBLICATIONS

International Search Report dated Mar. 28, 2017 in International (PCT) Application No. PCT/JP2017/000738.

*Primary Examiner* — Adam D Rogers
(74) *Attorney, Agent, or Firm* — Wenderoth, Lind & Ponack, L.L.P.

(57) ABSTRACT

A gear device includes a first double helical gear, a two-step gear, a second spur gear, and an intermediate shaft The two-step gear includes a second double helical gear meshing with the first double helical gear, and a first spur gear on a back surface side of the second double helical gear. The second spur gear meshes with the first spur gear. A housing includes a shaft support hole and a meshing guide groove. The shaft support hole houses one end side of the intermediate shaft. The meshing guide groove meshes the second double helical gear with the first double helical gear by guiding the intermediate shaft along a pitch circle of the second spur gear to a proximity of the shaft support hole while maintaining the first spur gear meshing with the (Continued)

second spur gear. The meshing guide groove rises up at the proximity of the shaft support hole.

10 Claims, 12 Drawing Sheets

(51) Int. Cl.
    *F16H 57/023*     (2012.01)
    *F16H 1/22*     (2006.01)
    *F16H 57/021*     (2012.01)

(52) U.S. Cl.
    CPC ............... *F16H 2057/02034* (2013.01); *Y10T 29/49464* (2015.01); *Y10T 29/49465* (2015.01)

(58) Field of Classification Search
    CPC ....... F16H 2057/005; F16H 2057/0056; F16H 2057/02034; F16H 2057/0225; F16H 2057/0228; F16H 2057/0235; Y10T 29/49464; Y10T 29/49465
    See application file for complete search history.

(56) References Cited

U.S. PATENT DOCUMENTS

| | | | | |
|---|---|---|---|---|
| 5,622,077 | A * | 4/1997 | Blanchet | B60S 1/166 15/250.3 |
| 6,685,183 | B2 * | 2/2004 | Kim | B65H 3/0669 271/114 |
| 9,342,101 | B2 * | 5/2016 | Hsu | G06F 1/1679 |
| 9,809,291 | B2 * | 11/2017 | Galloway | B63H 23/30 |
| 2004/0099090 | A1 * | 5/2004 | Hsu | F16H 3/34 74/665 GA |
| 2005/0081668 | A1 | 4/2005 | Hagihara | |
| 2009/0078074 | A1 | 3/2009 | Hagihara | |

FOREIGN PATENT DOCUMENTS

| | | |
|---|---|---|
| JP | 2005-121094 | 5/2005 |
| JP | 2007-132436 | 5/2007 |

* cited by examiner

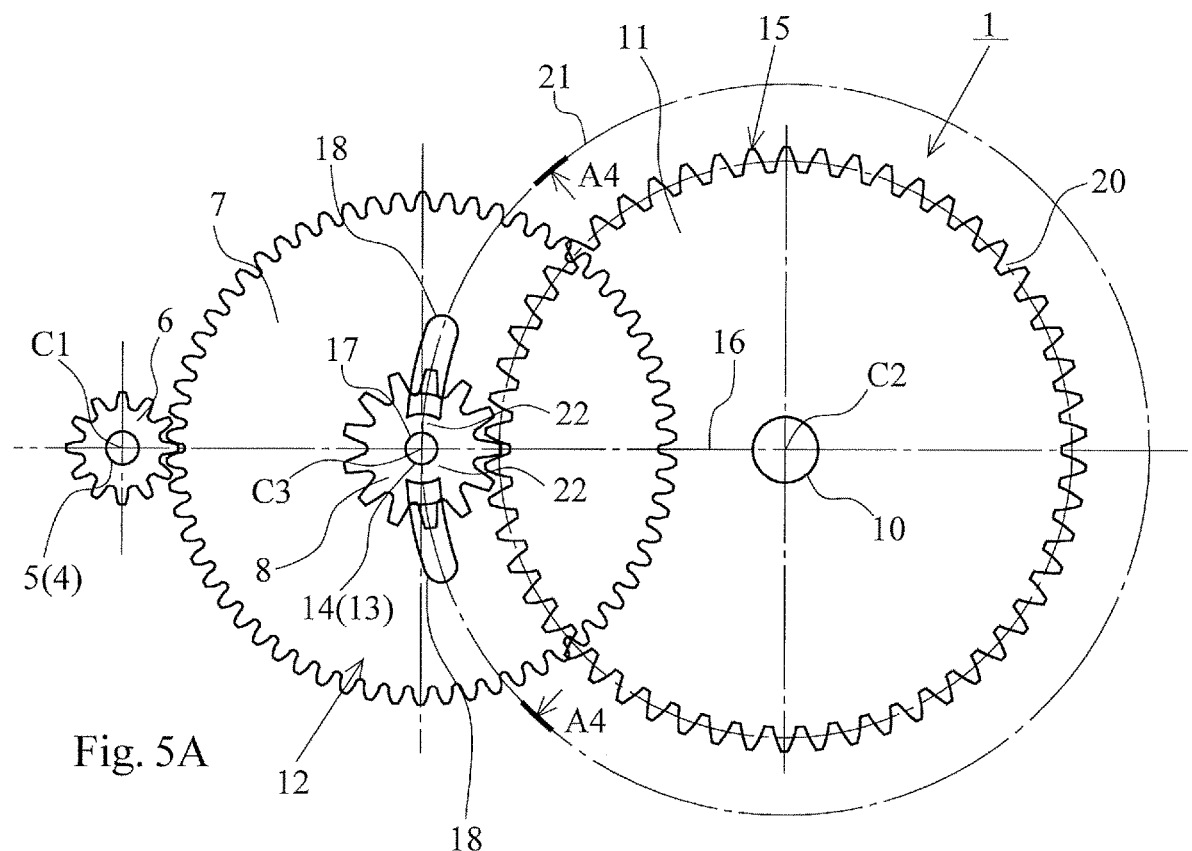
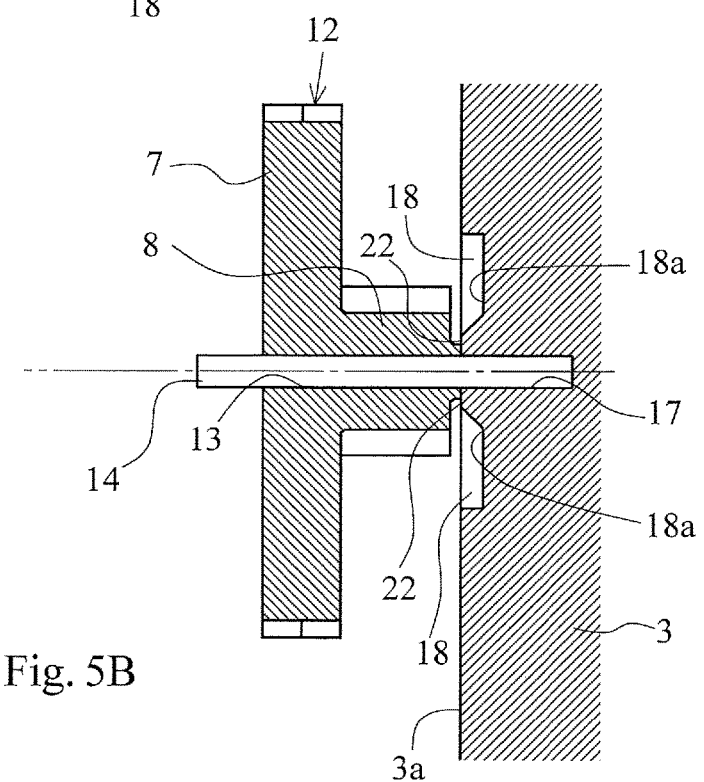
Fig. 5A
Fig. 5B

GEAR DEVICE AND METHOD FOR ASSEMBLING GEAR DEVICE

TECHNICAL FIELD

The present invention relates to a gear device constituting a power transmission mechanism, and a method for assembling the gear device.

BACKGROUND ART

While a conventional gear device constituting a power transmission mechanism is configured such that helical gears are mutually meshed to transmit rotations so as to reduce operating noise in the rotation transmission, double helical gears are used instead of the helical gears when a negative effect of a thrust force caused by the mesh of the helical gears is considerable (see JP-A-8-284677).

FIG. 11 includes drawings illustrating a gear device 100 where double helical gears are used instead of helical gears. The gear device 100 illustrated in FIG. 11 includes a gear train 101 that includes a first double helical gear 104 secured to a rotation shaft 103 of a motor 102, a second double helical gear 105 meshed with this first double helical gear 104, a first spur gear 107 integrally formed on a back surface 105a side (a side of a surface facing a housing 106) of this second double helical gear 105, and a second spur gear 108 meshed with this first spur gear 107 at the back surface 105a side of the second double helical gear 105. This gear device 100 illustrated in FIG. 11 is configured such that the second double helical gear 105 has a large diameter (a large number of teeth) compared with the first double helical gear 104 and the second spur gear 108 has a large diameter (a large number of teeth) compared with the first spur gear 107 so as to transmit the rotation of the motor 102 to the first double helical gear 104, the second double helical gear 105, the first spur gear 107, and the second spur gear 108 in this order to decelerate the rotation, thus transmitting the decelerated rotation of the motor 102 from an output shaft 110, which integrally turns with the second spur gear 108, to a driven unit (not illustrated).

The gear device 100 illustrated in FIG. 11 needs to be assembled such that a two-step gear 111, which includes the second double helical gear 105 and the first spur gear 107, is meshed with the first double helical gear 104 secured to the rotation shaft 103 of the motor 102 and the second spur gear 108 secured to the output shaft 110. In this gear device 100 illustrated in FIG. 11, the two-step gear 111 needs to mesh the second double helical gear 105 with the first double helical gear 104 while meshing the first spur gear 107 with the second spur gear 108. To ensure such assembling of the gear device 100, as disclosed in JP-A-8-284677, it is conceivable that the first double helical gear 104 is divided into a first helical gear 104a and a second helical gear 104b along a tooth width direction, and the first helical gear 104a is meshed with the second double helical gear 105. Subsequently, the second helical gear 104b is meshed with the second double helical gear 105, and the second helical gear 104b is secured to the first helical gear 104a with a plurality of bolts to be integrated (see FIG. 12). However, since the gear device 100 illustrated in FIG. 11 is a gear device to decelerate the rotation of the motor 102 and the first double helical gear 104 has the small diameter, there is no space for disposing the plurality of securing bolts, and there has been a problem that the technique disclosed in JP-A-8-284677 is not applicable to the gear device 100.

Therefore, the present inventor has developed a gear device that ensures easily assembling of a gear train in which double helical gears need to be mutually meshed, and a method for assembling the gear device.

SUMMARY OF THE INVENTION

The present invention relates to a gear device 1 that includes:

(A). a first double helical gear 6 secured to a rotation shaft 5 of a motor 4, the rotation shaft 5 projecting from a housing 3;

(B). a two-step gear 12 that includes a second double helical gear 7 and a first spur gear 8, the second double helical gear 7 meshing with the first double helical gear 6, the first spur gear 8 being integrally formed on a back surface 7a side of the second double helical gear 7, the first spur gear 8 being disposed between the back surface 7a side of the second double helical gear 7 and a surface 3a of the housing 3;

(C). a second spur gear 11 secured to an output shaft 10 such that the second spur gear 11 meshes with the first spur gear 8 at the back surface 7a side of the second double helical gear 7; and (D). an intermediate shaft 14 fitted to a shaft hole 13 of the two-step gear 12, the intermediate shaft 14 relatively rotatably and slidably movably supporting the two-step gear 12.

Then, the housing 3 has a shaft support hole 17 and a meshing guide groove 18. The shaft support hole 17 houses one end side of the intermediate shaft 14 fitted to the shaft hole 13 of the two-step gear 12 at a desired mesh position of the first double helical gear 6 with the second double helical gear 7. The meshing guide groove 18 meshes the second double helical gear 7 with the first double helical gear 6 by guiding the intermediate shaft 14 fitted to the shaft hole 13 of the two-step gear 12 along a pitch circle 20 of the second spur gear 11 to a proximity of the shaft support hole 17 while maintaining a state where the first spur gear 8 meshes with the second spur gear 11. The meshing guide groove 18 is formed to have a groove depth that smoothly and gradually decreases to the surface 3a of the housing 3 at the proximity of the shaft support hole 17.

The present invention relates to a gear device 1 that includes:

(A). a first double helical gear 6 secured to a rotation shaft 5 of a motor 4, the rotation shaft projecting from a housing 3;

(B). a two-step gear 12 that includes a second double helical gear 7 and a first helical gear (8), the second double helical gear 7 meshing with the first double helical gear 6, the first helical gear (8) being integrally formed on a back surface 7a side of the second double helical gear 7, the first helical gear (8) being disposed between the back surface 7a side of the second double helical gear 7 and a surface 3a of the housing 3;

(C). a second helical gear (11) secured to an output shaft 10 such that the second helical gear (11) meshes with the first helical gear (8) at the back surface 7a side of the second double helical gear 7; and (D). an intermediate shaft 14 fitted to a shaft hole 13 of the two-step gear 12, the intermediate shaft 14 relatively rotatably and slidably movably supporting the two-step gear 12.

Then, the housing 3 has a shaft support hole 17 and a meshing guide groove 18. The shaft support hole 17 houses one end side of the intermediate shaft 14 fitted to the shaft hole 13 of the two-step gear 12 at a desired mesh position of the first double helical gear 6 with the second double helical gear 7. The meshing guide groove 18 meshes the second double helical gear 7 with the first double helical gear 6 by guiding the intermediate shaft 14 fitted to the shaft hole 13 of the two-step gear 12 along a pitch circle 20 of the second helical gear (11) to a proximity of the shaft support hole 17 while maintaining a state where the first helical gear (8) meshes with the second helical gear (11). The meshing guide groove 18 is formed to have a groove depth that smoothly and gradually decreases to the surface 3a of the housing 3 at the proximity of the shaft support hole 17.

Effects of the Invention

With the gear device of the present invention, simply meshing the first spur gear of the two-step gear with the second spur gear and engaging the intermediate shaft of the two-step gear with the meshing guide groove and moving the intermediate shaft along the meshing guide groove ensure meshing the second double helical gear of the two-step gear with the first double helical gear and smoothly moving the intermediate shaft of the two-step gear to the shaft support hole. As a result, the gear device according to the present invention ensures easy assembling of the first double helical gear secured to the rotation shaft of the motor with the second double helical gear, which meshes with this first double helical gear, of the two-step gear, and easy assembling of the first spur gear of the two-step gear with the second spur gear that meshes with this first spur gear.

With the gear device of the present invention, simply meshing the first helical gear of the two-step gear with the second helical gear and engaging the intermediate shaft of the two-step gear with the meshing guide groove and moving the intermediate shaft along the meshing guide groove ensure meshing the second double helical gear of the two-step gear with the first double helical gear and smoothly moving the intermediate shaft of the two-step gear to the shaft support hole. As a result, the gear device according to the present invention ensures easy assembling of the first double helical gear secured to the rotation shaft of the motor with the second double helical gear, which meshes with this first double helical gear, of the two-step gear, and easy assembling of the first helical gear of the two-step gear with the second helical gear that meshes with this first helical gear.

BRIEF DESCRIPTION OF THE DRAWINGS

FIGS. 5A and 5B illustrate a fourth assembly step of the gear device according to the first embodiment of the present invention, with FIG. 5A being a plan view transparently illustrating the two-step gear and the second spur gear of the gear device while the cover is omitted, and FIG. 5B being a cross-sectional view of the gear device taken along a line A4-A4 in FIG. 5A.

DESCRIPTION OF PREFERRED EMBODIMENTS

First Embodiment

The following describes a first embodiment of the present invention in detail based on the drawings.
(Gear Device)
FIG. 1 includes drawings illustrating a gear device 1 according to the first embodiment of the present invention.

Figure 1A:
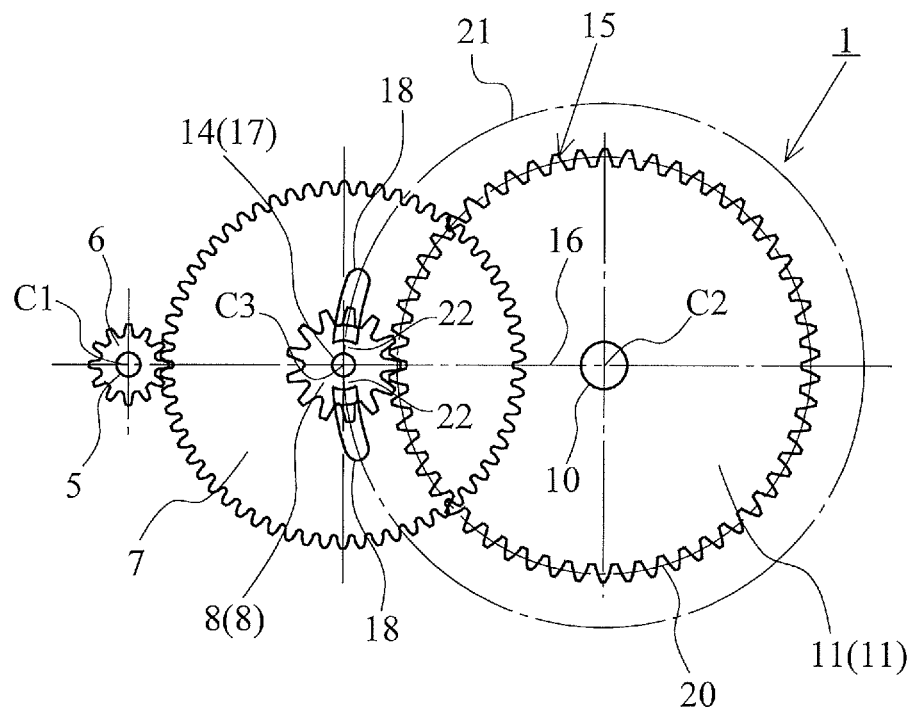
FIGS. 1A and 1B illustrate a gear device according to a first embodiment of the present invention, with FIG. 1A being a plan view illustrating the gear device while a cover is removed, and a drawing transparently illustrating a two-step gear and a second spur gear of the gear device, and FIG. 1B being a vertical cross-sectional view of the gear device.
Figure 1B:
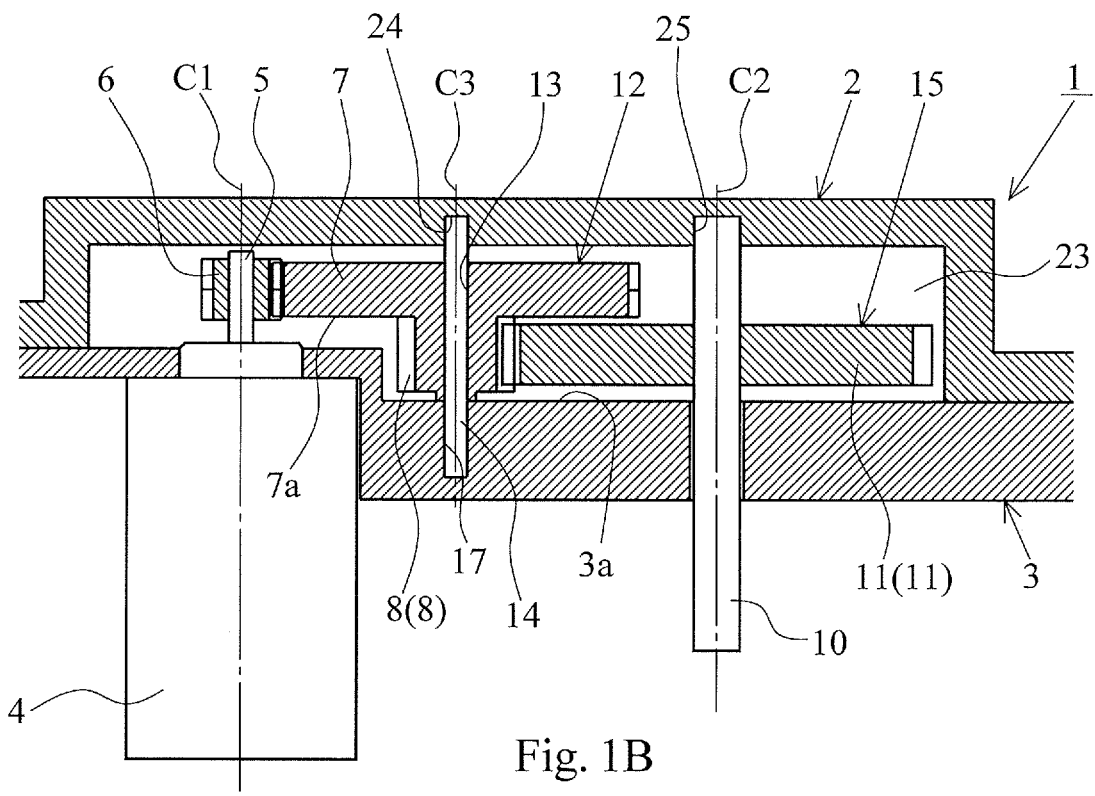

FIG. 1A is a plan view (a plan view illustrating the gear device 1 while a cover 2 is removed) of the gear device 1. FIG. 1B is a vertical cross-sectional view of the gear device 1. In this embodiment, FIG. 1A transparently illustrates a two-step gear 12 and a second spur gear 11, which are described below in detail, for easily understanding a structure of the gear device 1.

The gear device 1 illustrated in FIG. 1 includes a first double helical gear 6 secured to a rotation shaft 5 of a motor 4 projecting from a housing 3, a second double helical gear 7 meshed with this first double helical gear 6, a first spur gear 8 integrally formed on a back surface 7a side of the second double helical gear 7 and disposed between the back surface 7a side of the second double helical gear 7 and a surface 3a of the housing 3, and a second spur gear 11 secured to an output shaft 10 so as to be meshed with the first spur gear 8 at the back surface 7a side of the second double helical gear 7. Then, the second double helical gear 7 and the first spur gear 8 constitute the two-step gear 12 configured such that a shaft hole 13 is disposed on a position of the rotational center, and an intermediate shaft 14 is relatively turnably and slidably movably fitted to the shaft hole 13. Thus, the gear device 1 includes a gear train 15 including the first double helical gear 6, the second double helical gear 7, the first spur gear 8, and the second spur gear 11. The first double helical gear 6, the two-step gear 12, and the second spur gear 11 are made of synthetic resin materials (polyamide, polyacetal, and the like) or metals (brass, stainless steel, and the like).

As illustrated in FIG. 1, the gear device 1 includes the second double helical gear 7 formed to have a large diameter (a large number of teeth) compared with the first double helical gear 6 and the second spur gear 11 formed to have a large diameter (a large number of teeth) compared with the first spur gear 8, thus decelerating a rotation of the rotation shaft 5 of the motor 4 to transmit the rotation to the output shaft 10. The first spur gear 8 has a small diameter compared with the second double helical gear 7, and this prevents visually perceiving a mesh position with the first spur gear 8 from an upper side (a surface side) of the second double helical gear 7. The output shaft 10 is coupled to a driven unit (not illustrated) inside the housing 3 so as to transmit the rotation to the driven unit.

The intermediate shaft 14 has one end side housed in a shaft support hole 17 formed on the housing 3 such that a shaft center C3 is positioned on a straight line 16 connecting a shaft center C1 of the rotation shaft 5 of the motor 4 to a shaft center C2 of the output shaft 10, thus turnably supporting the two-step gear 12. That is, the gear device 1 is configured such that the rotational center (the shaft center C1 of the rotation shaft 5) of the first double helical gear 6, the rotational center (the shaft center C3 of the intermediate shaft 14) of the two-step gear 12, and the rotational center (the shaft center C2 of the output shaft 10) of the second spur gear 11 are positioned on the straight line 16 to transmit the rotation of the rotation shaft 5 of the motor 4 to the output shaft 10.

The housing 3 includes a pair of meshing guide grooves 18 having the straight line 16 connecting the shaft center C1 of the rotation shaft 5 of the motor 4 to the shaft center C2 of the output shaft 10 as a symmetry axis. The meshing guide grooves 18 are elongated holes formed on the surface 3a side (the side of the surface facing the two-step gear 12) of the housing 3 along a pitch circle 20 of the second spur gear 11. The meshing guide grooves 18 are formed to have groove centers concentric to the pitch circle 20 of the second spur gear 11, and to be positioned on a virtual circle 21 that passes through the center of the shaft support hole 17. The meshing guide grooves 18 are configured to slidingly move (guide) the intermediate shaft 14 to the proximity of the shaft support hole 17. The housing 3 has flat surfaces as gear support surfaces 22 at the proximity of an opening edge of the shaft support hole 17. Then, the meshing guide grooves 18 have grooves that gradually decrease in depth toward the gear support surfaces 22 at the proximities of the gear support surfaces 22, and have groove bottoms 18a formed to rise up to the gear support surfaces 22 (the surface 3a of the housing 3). The gear support surface 22 is a plane identical to the surface 3a of the housing 3, and turnably supports the two-step gear 12.

The cover 2 is removably secured to the surface 3a side of the housing 3, forms a space 23 with the housing 3, and turnably houses the gear train 15 including the first double helical gear 6, the two-step gear 12, and the second spur gear 11 in the space 23. This cover 2 is secured to the housing 3 such that after the gear train 15 including the first double helical gear 6, the two-step gear 12, and the second spur gear 11 is assembled, an end portion (an upper end portion in FIG. 1B) of the intermediate shaft 14 is engaged with a first bearing hole 24, and an end portion (an upper end portion in FIG. 1B) of the output shaft 10 is engaged with a second bearing hole 25.

(Method for Assembling Gear Device)

Figure 2A:
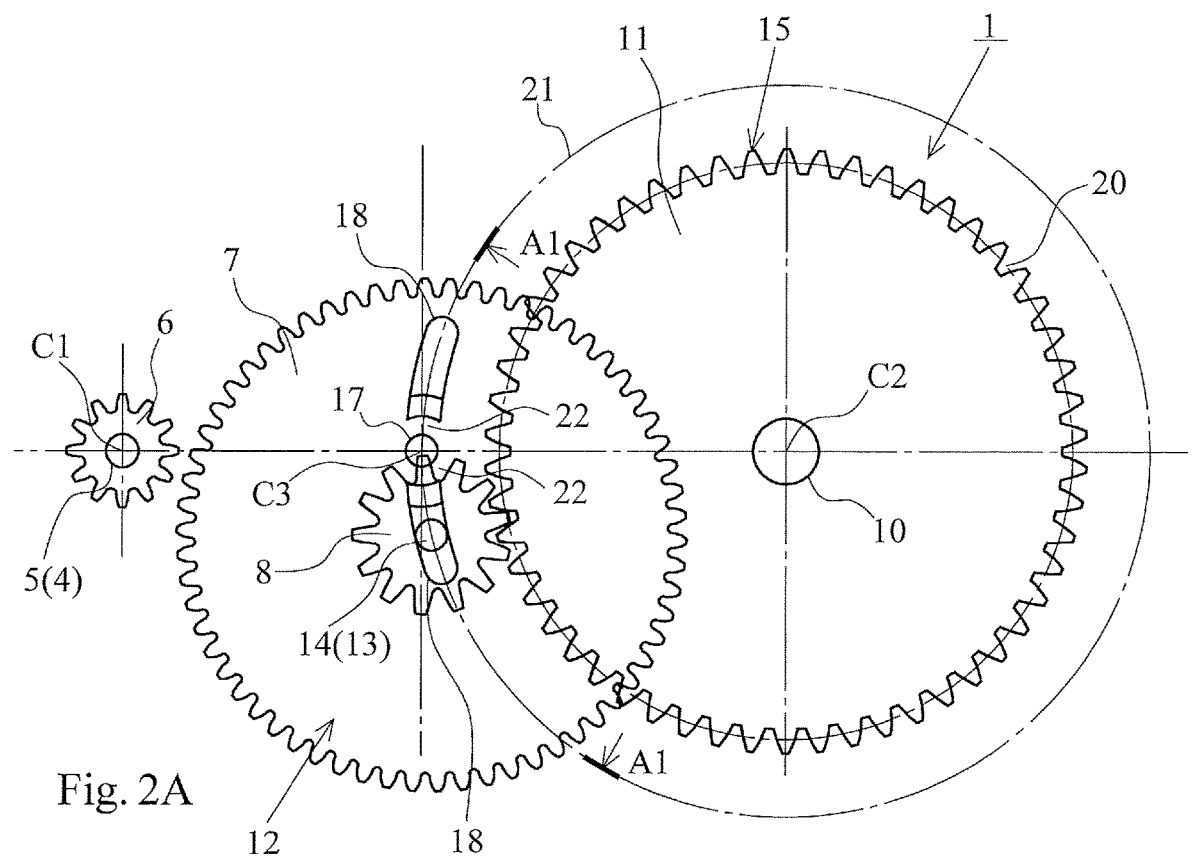
FIGS. 2A and 2B illustrate a first assembly step of the gear device according to the first embodiment of the present invention, with FIG. 2A being a plan view transparently illustrating the two-step gear and the second spur gear of the gear device while the cover is omitted, and FIG. 2B being a cross-sectional view of the gear device taken along a line A1-A1 in FIG. 2 A.
Figure 2B:
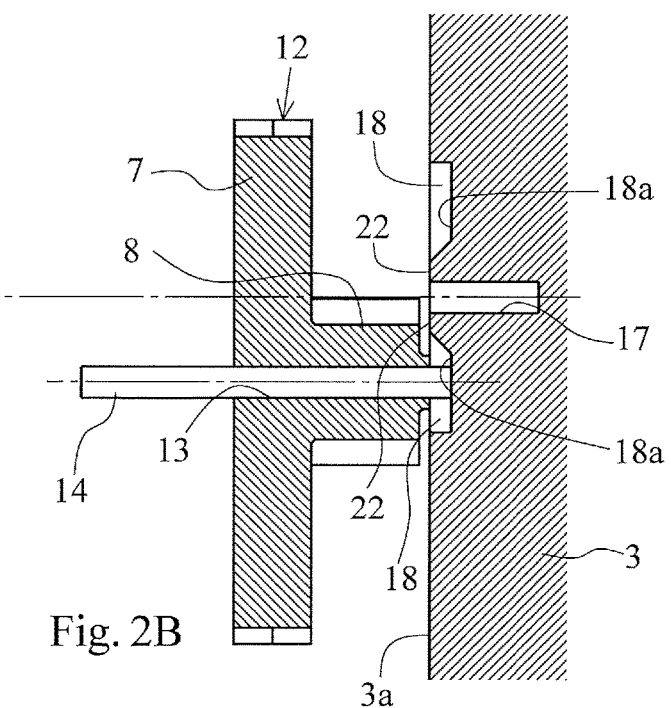

FIG. 2 includes drawings illustrating a first assembly step of the gear device 1. FIG. 2A is a plan view illustrating the gear device 1 while the cover 2 is omitted, and a drawing transparently illustrating the two-step gear 12 and the second spur gear 11. FIG. 2B is a cross-sectional view of the gear device 1 taken along a line A1-A1 in FIG. 2A.

In this first assembly step of the gear device 1 illustrated in FIG. 2, among the first double helical gear 6 secured to the rotation shaft 5 of the motor 4 and the second spur gear 11 secured to the output shaft 10, the first spur gear 8 of the two-step gear 12 is meshed with the second spur gear 11 first, and a distal end side (one end side), which is fitted to the shaft hole 13 of the two-step gear 12, of the intermediate shaft 14 is engaged with the meshing guide groove 18.

Figure 3A:
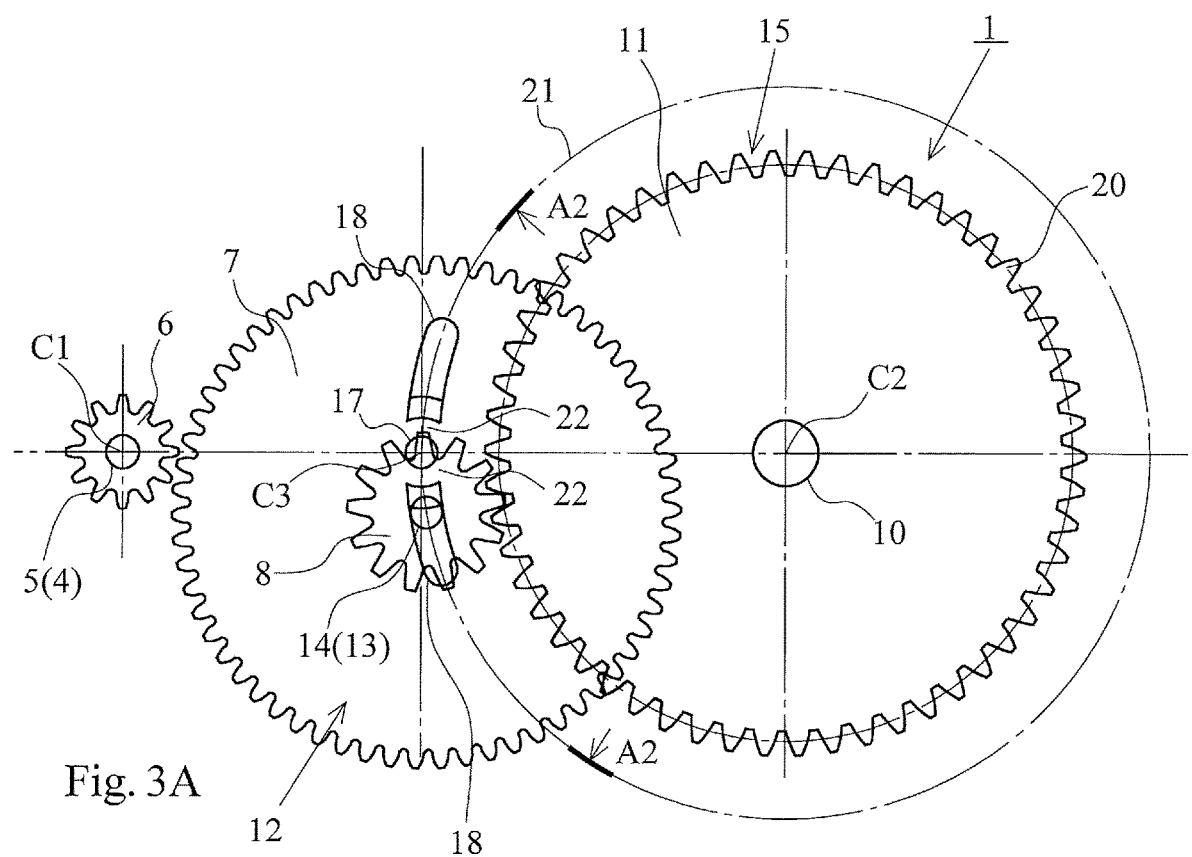
FIGS. 3A and 3B illustrate a second assembly step of the gear device according to the first embodiment of the present invention, with FIG. 3A being a plan view transparently illustrating the two-step gear and the second spur gear of the gear device while the cover is omitted, and FIG. 3B being a cross-sectional view of the gear device taken along a line A2-A2 in FIG. 3A.
Figure 3B:
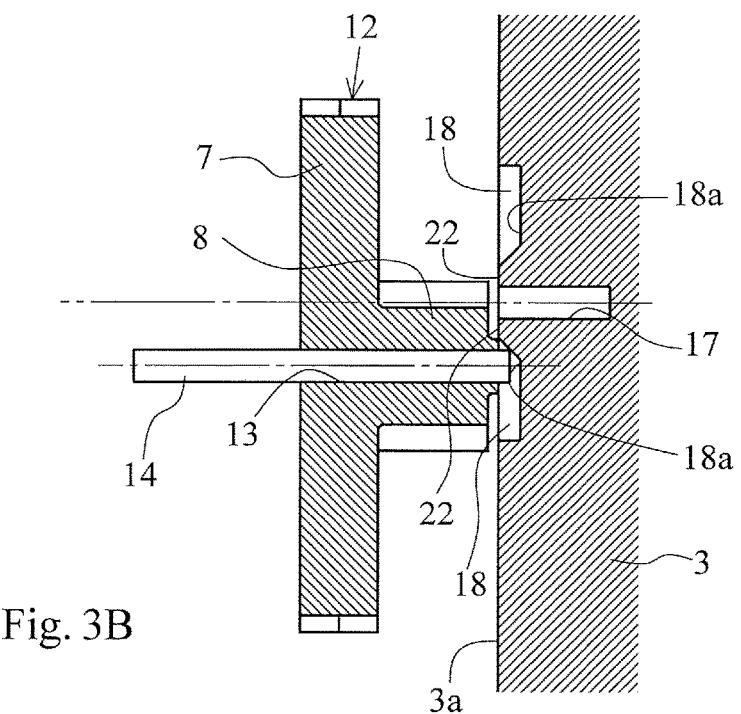

FIG. 3 includes drawings illustrating a second assembly step of the gear device 1. FIG. 3A is a plan view illustrating the gear device 1 while the cover 2 is omitted, and a drawing transparently illustrating the two-step gear 12 and the second spur gear 11. FIG. 3B is a cross-sectional view of the gear device 1 taken along a line A2-A2 in FIG. 3A.

In this second assembly step of the gear device 1 illustrated in FIG. 3, the intermediate shaft 14 in the first assembly step is moved with the two-step gear 12 toward the shaft support hole 17 along the meshing guide groove 18, thus meshing the second double helical gear 7 of the two-step gear 12 with the first double helical gear 6. At this time, the intermediate shaft 14 and the two-step gear 12 move along the virtual circle 21 concentric to the pitch circle 20 of the second spur gear 11 in a state where the mesh of the first spur gear 8 with the second spur gear 11 is maintained. In this second assembly step of the gear device 1 illustrated in FIG. 3, the intermediate shaft 14 is positioned within the meshing guide groove 18, and has not reached the gear support surface 22 at the proximity of the opening edge of the shaft support hole 17.

Figure 4A:
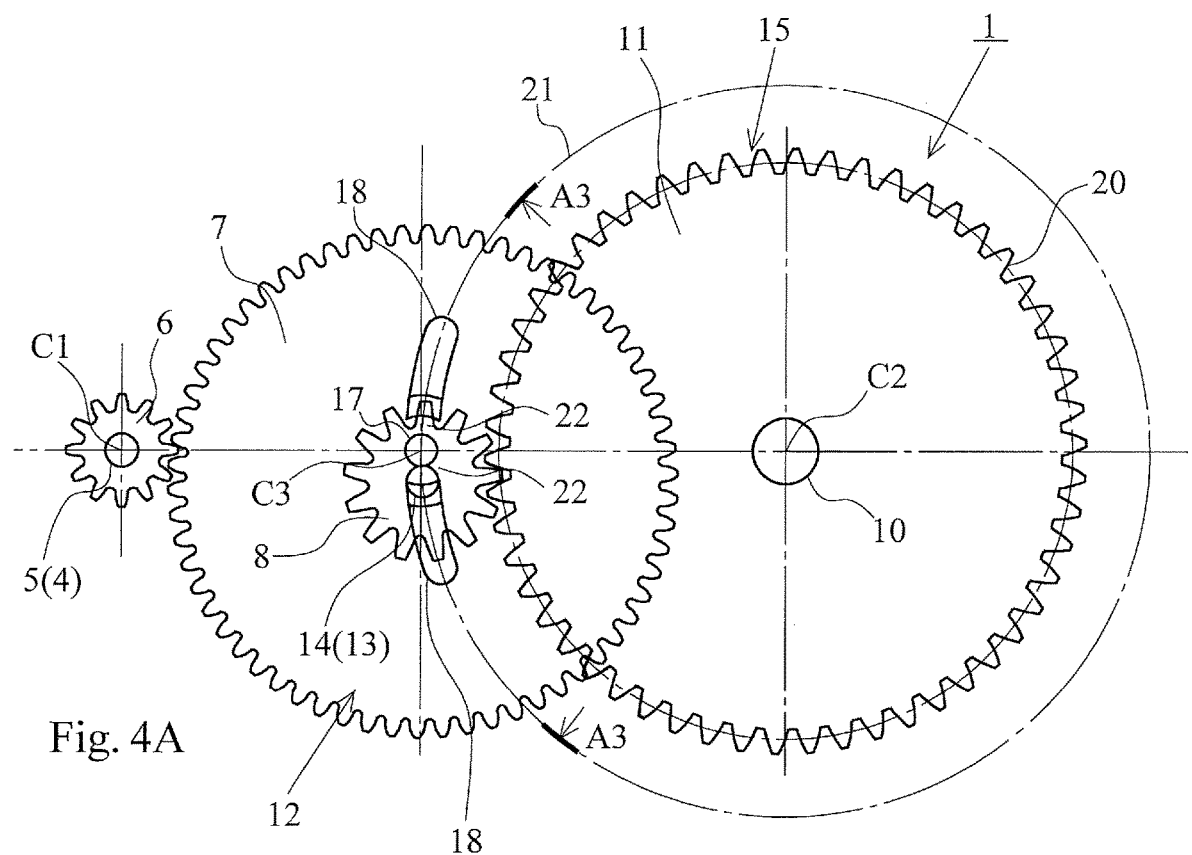
FIGS. 4A and 4B illustrate a third assembly step of the gear device according to the first embodiment of the present invention, with FIG. 4A being a plan view transparently illustrating the two-step gear and the second spur gear of the gear device while the cover is omitted, and FIG. 4B being a cross-sectional view of the gear device taken along a line A3-A3 in FIG. 4A.
Figure 4B:
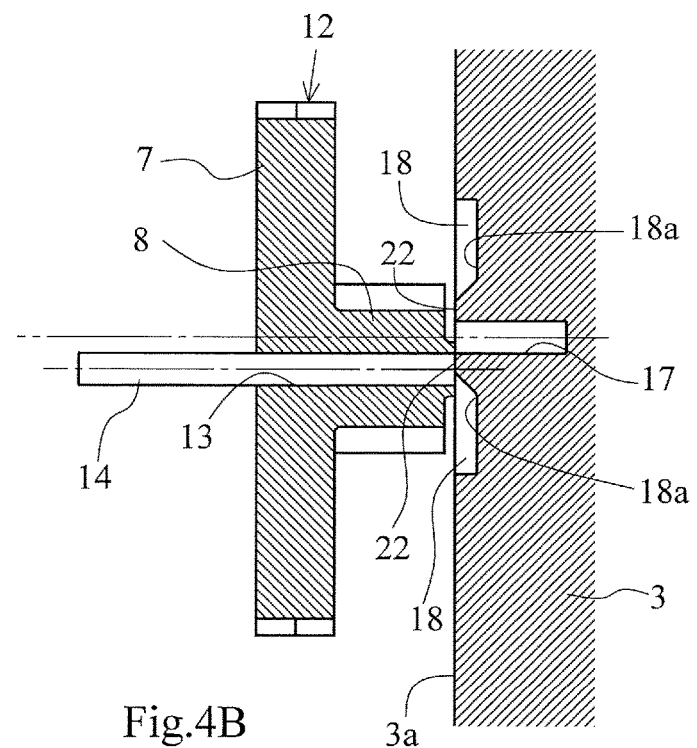

FIG. 4 includes drawings illustrating a third assembly step of the gear device 1. FIG. 4A is a plan view illustrating the gear device 1 while the cover 2 is omitted, and a drawing transparently illustrating the two-step gear 12 and the second spur gear 11. FIG. 4B is a cross-sectional view of the gear device 1 taken along a line A3-A3 in FIG. 4A.

In this third assembly step of the gear device 1 illustrated in FIG. 4, the intermediate shaft 14 in the second assembly step is further moved with the two-step gear 12 toward the shaft support hole 17, and the intermediate shaft 14 is positioned at the proximity of the shaft support hole 17 on the gear support surface 22. At this time, the two-step gear 12 advances the mesh of the second double helical gear 7 with the first double helical gear 6 while maintaining the mesh of the first spur gear 8 with the second spur gear 11.

FIG. 5 includes drawings illustrating a fourth assembly step of the gear device 1. FIG. 5A is a plan view illustrating the gear device 1 while the cover 2 is omitted, and a drawing transparently illustrating the two-step gear 12 and the second spur gear 11. FIG. 5B is a cross-sectional view of the gear device 1 taken along a line A4-A4 in FIG. 5A.

In this fourth assembly step of the gear device 1 illustrated in FIG. 5, the intermediate shaft 14 in the third assembly step is moved with the two-step gear 12 to above the shaft support hole 17, and the intermediate shaft 14 is dropped into the shaft support hole 17. At this time, the first spur gear 8 of the two-step gear 12 is meshed with the second spur gear 11, and the second double helical gear 7 of the two-step gear 12 is meshed with the first double helical gear 6, thus the rotational center (the shaft center C2 of the intermediate shaft 14) of the two-step gear 12 moves along the virtual circle 21. Accordingly, the first double helical gear 6, the two-step gear 12 (the second double helical gear 7, the first spur gear 8), and the second spur gear 11 are meshed at a desired mesh position (a mesh position where the rotational center of the first double helical gear 6, the rotational center of the two-step gear 12, and the rotational center of the second spur gear 11 are positioned on the straight line 16), thus the rotation of the rotation shaft 5 of the motor 4 is smoothly transmitted to the output shaft 10 via the first double helical gear 6, the two-step gear 12, and the second spur gear 11.

(Effect of First Embodiment)

As described above, with the gear device 1 of this embodiment, simply meshing the first spur gear 8 of the two-step gear 12 with the second spur gear 11 and engaging the intermediate shaft 14 of the two-step gear 12 with the meshing guide groove 18 and moving the intermediate shaft 14 along the meshing guide groove 18 ensure meshing the second double helical gear 7 of the two-step gear 12 with the first double helical gear 6 and smoothly moving the intermediate shaft 14 of the two-step gear 12 to the shaft support hole 17. As a result, the gear device 1 according to the embodiment ensures easy assembling of the first double helical gear 6 secured to the rotation shaft 5 of the motor 4 with the second double helical gear 7, which meshes with this first double helical gear 6, of the two-step gear 12, and easy assembling of the first spur gear 8 of the two-step gear 12 with the second spur gear 11 that meshes with this first spur gear 8.

With the gear device 1 of this embodiment, simply engaging the intermediate shaft 14 with the meshing guide groove 18 determines an interaxial distance between the first spur gear 8 and the second spur gear 11, thus ensuring easy meshing of the first spur gear 8 with the second spur gear 11 even in a state where the mesh position of the first spur gear 8 with the second spur gear 11 cannot be visually perceived from the upper side of the second double helical gear 7.

According to the gear device 1 of this embodiment, the pair of the meshing guide grooves 18 having the straight line 16 connecting the shaft center C1 of the rotation shaft 5 of the motor 4 to the shaft center C2 of the output shaft 10 as the symmetry axis are formed on the housing 3. Then, the meshing guide groove 18 that facilitates a work by an assembly worker can be selected to use, thus improving the work efficiency of the assembly.

With the method for assembling the gear device 1 according to the embodiment, simply meshing the first spur gear 8 of the two-step gear 12 with the second spur gear 11 and engaging the intermediate shaft 14 of the two-step gear 12 with the meshing guide groove 18 and moving the intermediate shaft 14 along the meshing guide groove 18 ensure meshing the second double helical gear 7 of the two-step gear 12 with the first double helical gear 6 and smoothly moving the intermediate shaft 14 of the two-step gear 12 to the shaft support hole 17. As a result, the method for assembling the gear device 1 according to the embodiment ensures easy assembling of the first double helical gear 6 secured to the rotation shaft 5 of the motor 4 with the second double helical gear 7, which meshes with this first double helical gear 6, of the two-step gear 12, and easy assembling of the first spur gear 8 of the two-step gear 12 with the second spur gear 11 that meshes with this first spur gear 8.

Second Embodiment (Gear Device)

Figure 6A:
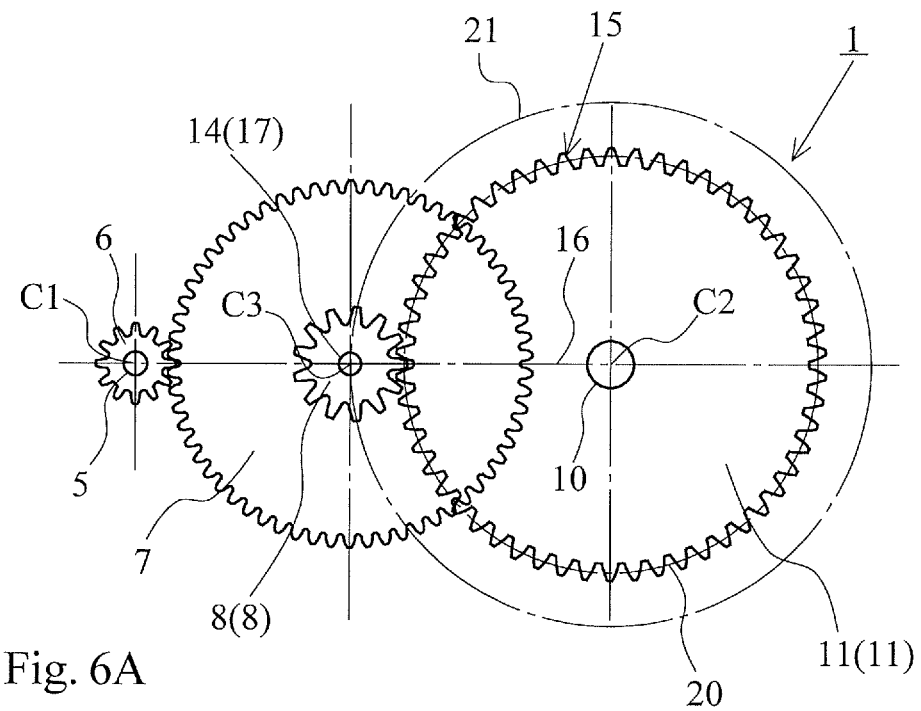
FIGS. 6A and 6B illustrate a gear device according to a second embodiment of the present invention, with FIG. 6A being a plan view illustrating the gear device while a cover is removed, and transparently illustrating a two-step gear and a second spur gear of the gear device, and FIG. 6B being a vertical cross-sectional view of the gear device.
Figure 6B:
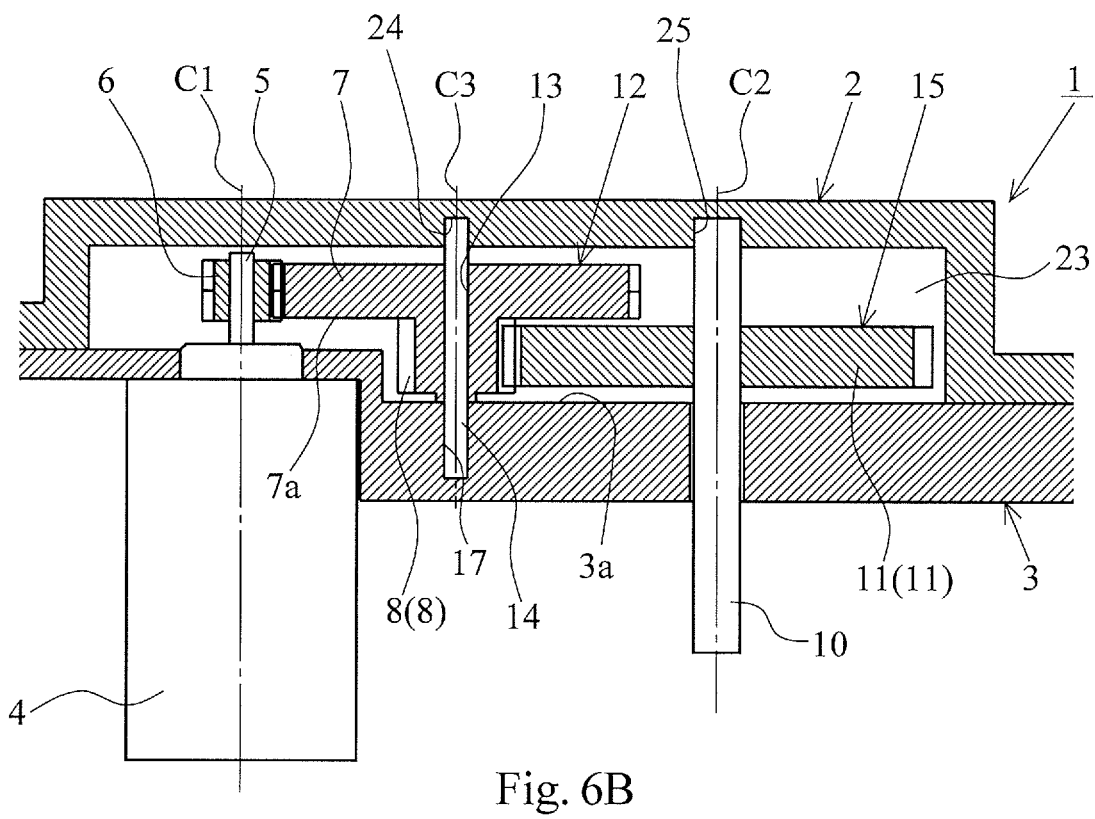

FIG. 6 includes drawings illustrating a gear device 1 according to a second embodiment of the present invention. The gear device 1 illustrated in FIG. 6 has a configuration common to that of the gear device 1 according to the first embodiment excluding a point that the meshing guide groove 18 is not formed. Then, identical reference numerals are attached to configuration parts identical to those of the gear device 1 according to the first embodiment, and therefore the following omits the overlapping explanation. FIG. 6A is a plan view (a plan view illustrating the gear device 1 while a cover 2 is removed) of the gear device 1. FIG. 6B is a vertical cross-sectional view of the gear device 1. In this embodiment, FIG. 6A transparently illustrates a two-step gear 12 and a second spur gear 11 for easily understanding a structure of the gear device 1.

(Method for Assembling Gear Device)

Figure 7A:
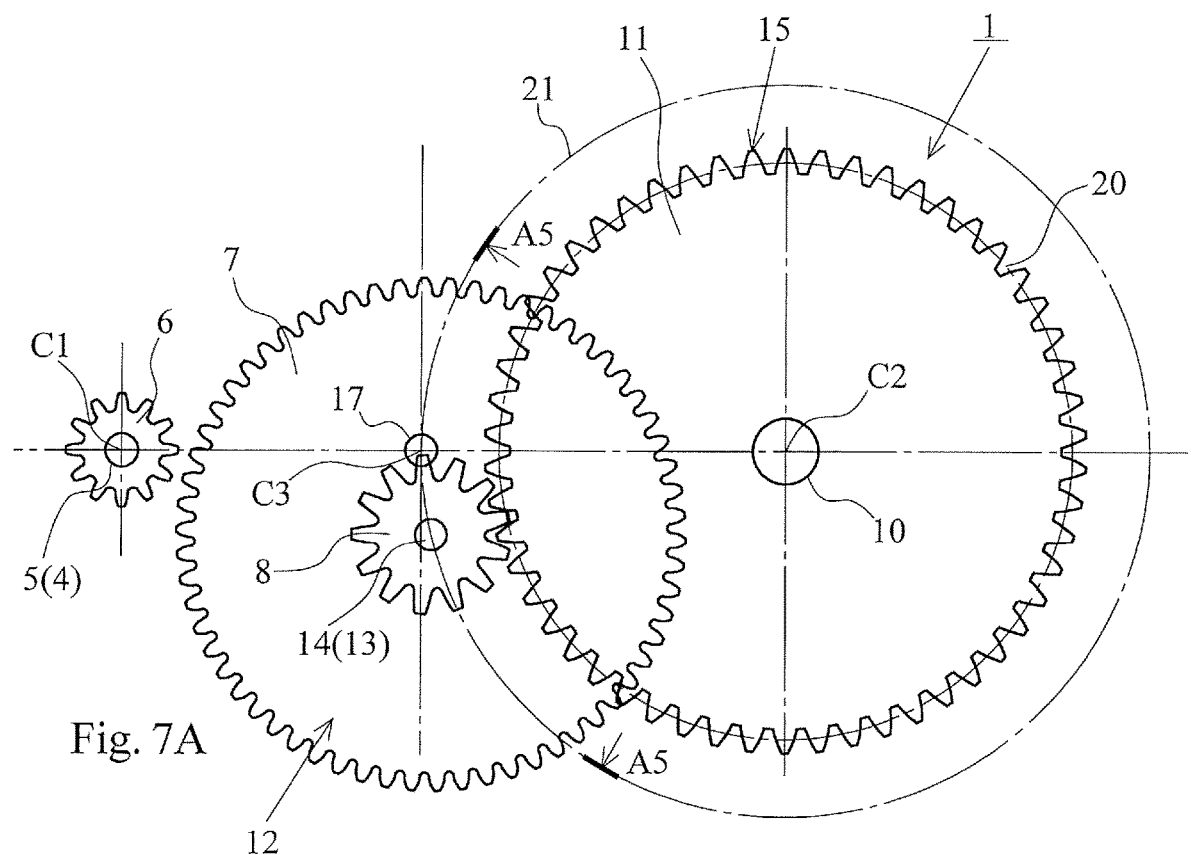
FIGS. 7A and 7B illustrate a first assembly step of the gear device according to the second embodiment of the present invention, with FIG. 7A being a plan view transparently illustrating the two-step gear and the second spur gear of the gear device while the cover is omitted, and FIG. 7B being a cross-sectional view of the gear device taken along a line A5-A5 in FIG. 7A.
Figure 7B:
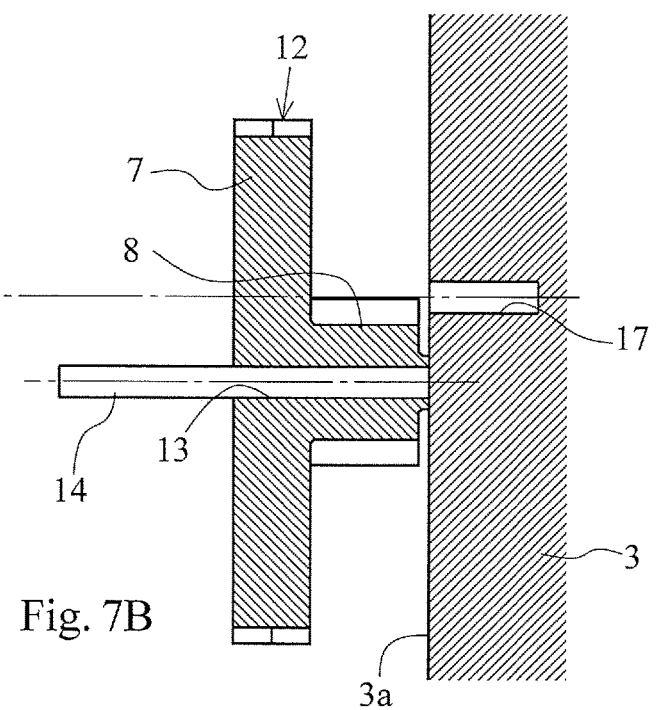

FIG. 7 includes drawings illustrating a first assembly step of the gear device 1 according to the embodiment. FIG. 7A is a plan view illustrating the gear device 1 while the cover 2 is omitted, and a drawing transparently illustrating the two-step gear 12 and the second spur gear 11. FIG. 7B is a cross-sectional view of the gear device 1 taken along a line A5-A5 in FIG. 7A.

In this first assembly step of the gear device 1 illustrated in FIG. 7, among the first double helical gear 6 secured to the rotation shaft 5 of the motor 4 and the second spur gear 11 secured to the output shaft 10, the first spur gear 8 of the two-step gear 12 is meshed with the second spur gear 11 first. At this time, the second double helical gear 7 of the two-step gear 12 has not meshed with the first double helical gear 6. The intermediate shaft 14 is relatively rotatably and slidably movably fitted to the shaft hole 13 of the two-step gear 12.

Figure 8A:
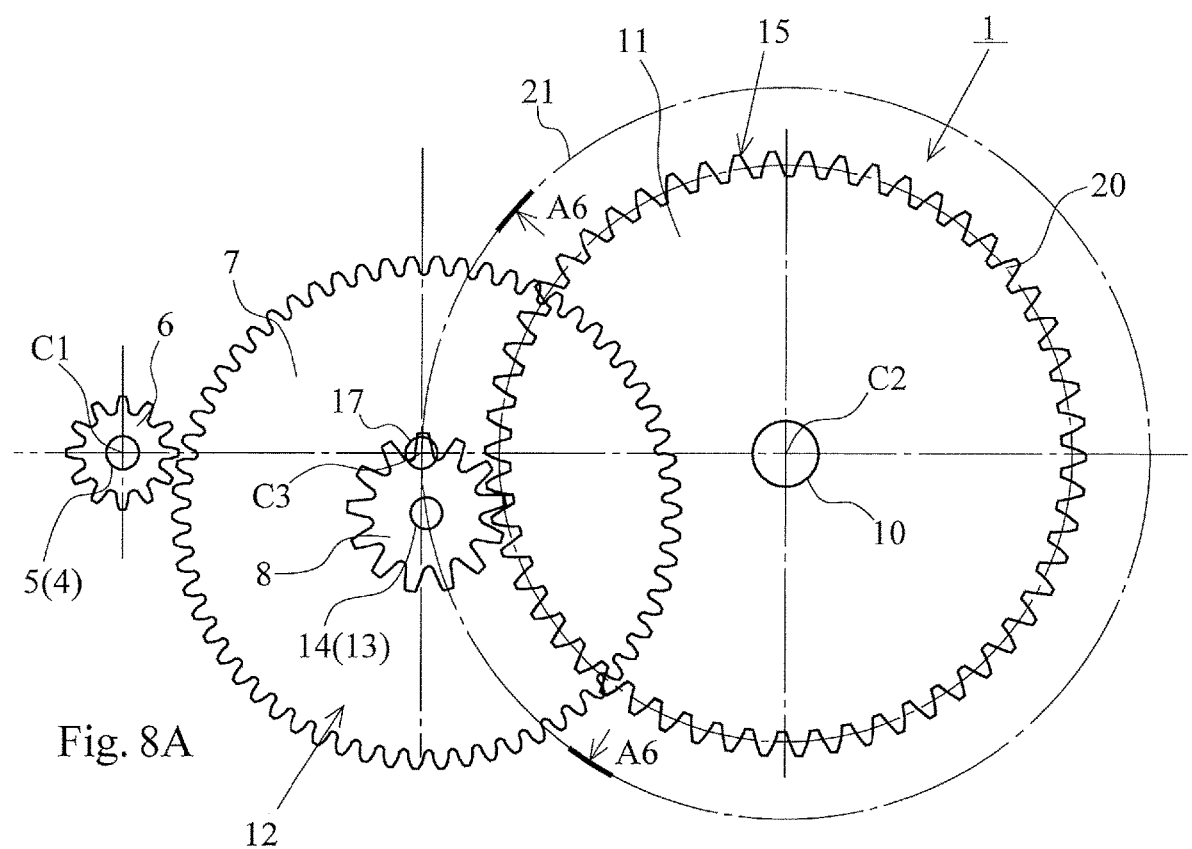
FIGS. 8A and 8B illustrate a second assembly step of the gear device according to the second embodiment of the present invention, with FIG. 8A being a plan view transparently illustrating the two-step gear and the second spur gear of the gear device while the cover is omitted, and FIG. 8B being a cross-sectional view of the gear device taken along a line A6-A6 in FIG. 8A.
Figure 8B:
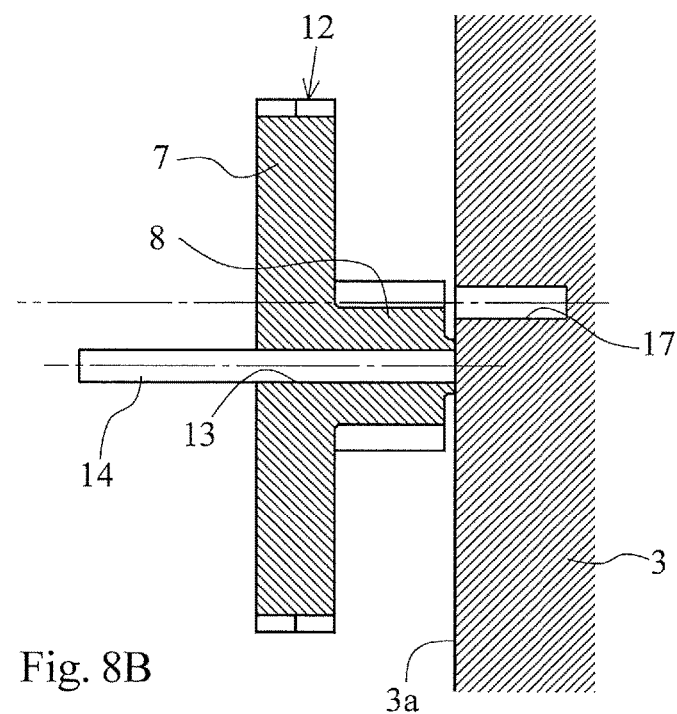

FIG. 8 includes drawings illustrating a second assembly step of the gear device 1 according to the embodiment. FIG. 8A is a plan view illustrating the gear device 1 while the cover 2 is omitted, and a drawing transparently illustrating the two-step gear 12 and the second spur gear 11. FIG. 8B is a cross-sectional view of the gear device 1 taken along a line A6-A6 in FIG. 8A.

In this second assembly step of the gear device 1 illustrated in FIG. 8, the two-step gear 12 and the intermediate shaft 14 in the first assembly step are moved in a direction along the pitch circle 20 of the second spur gear 11 and a direction toward the shaft support hole 17 while the meshing state of the first spur gear 8 with the second spur gear 11 is maintained, thus meshing the second double helical gear 7 of the two-step gear 12 with the first double helical gear 6.

Figure 9A:
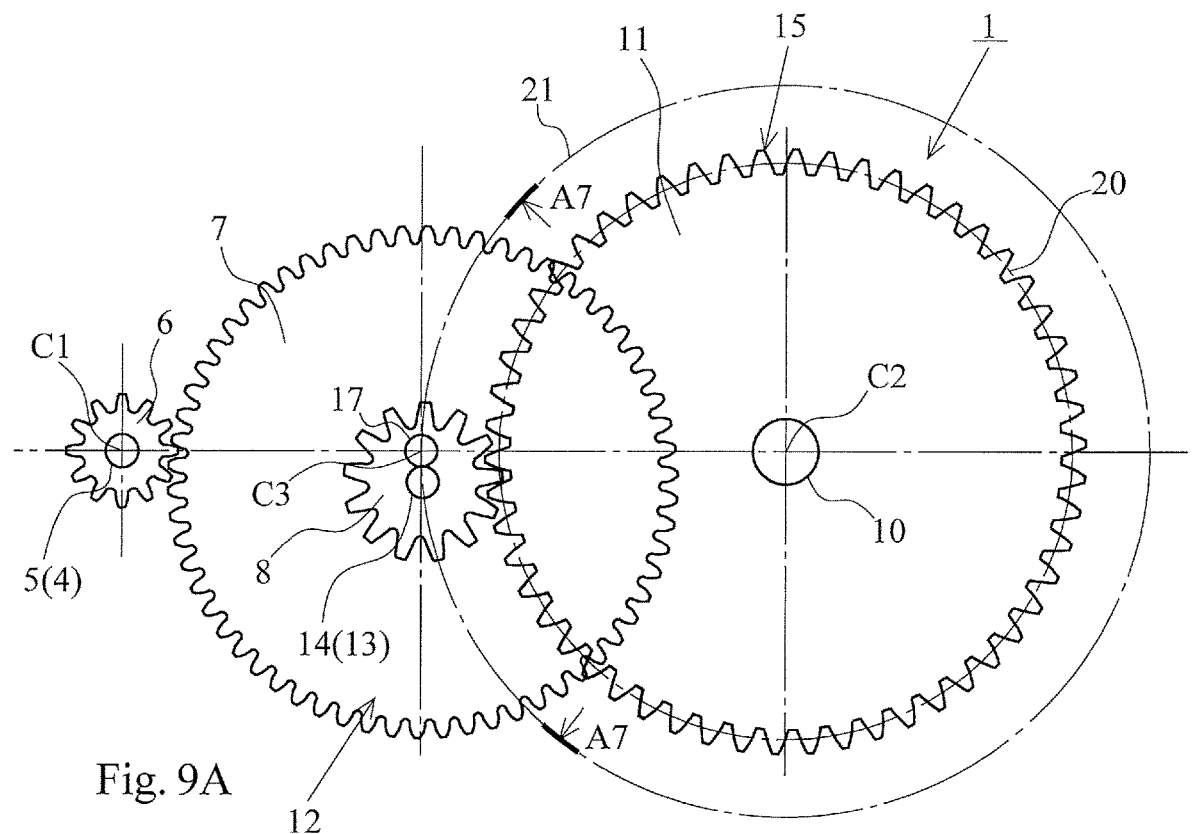
FIGS. 9A and 9B illustrate a third assembly step of the gear device according to the second embodiment of the present invention, with FIG. 9A being a plan view transparently illustrating the two-step gear and the second spur gear of the gear device while the cover is omitted, and FIG. 9B being a cross-sectional view of the gear device taken along a line A7-A7 in FIG. 9A.
Figure 9B:
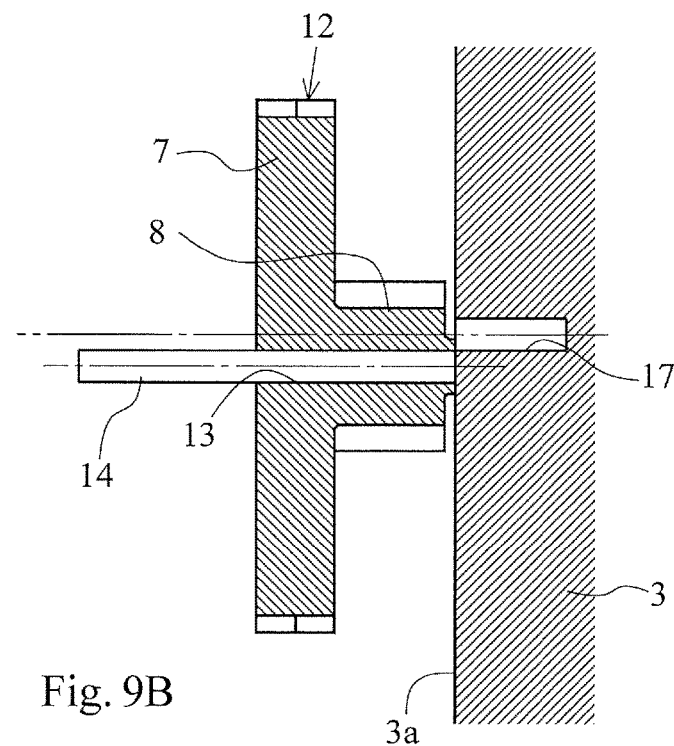

FIG. 9 includes drawings illustrating a third assembly step of the gear device 1 according to the embodiment. FIG. 9A is a plan view illustrating the gear device 1 while the cover 2 is omitted, and a drawing transparently illustrating the two-step gear 12 and the second spur gear 11. FIG. 9B is a cross-sectional view of the gear device 1 taken along a line A7-A7 in FIG. 9A.

In this third assembly step of the gear device 1 illustrated in FIG. 9, the two-step gear 12 and the intermediate shaft 14 in the second assembly step are further moved in the direction along the pitch circle 20 of the second spur gear 11 and the direction toward the shaft support hole 17, and the mesh of the second double helical gear 7 with the first double helical gear 6 is advanced while the mesh of the first spur gear 8 with the second spur gear 11 is maintained, thus positioning the intermediate shaft 14 at the proximity of the shaft support hole 17.

Figure 10A:
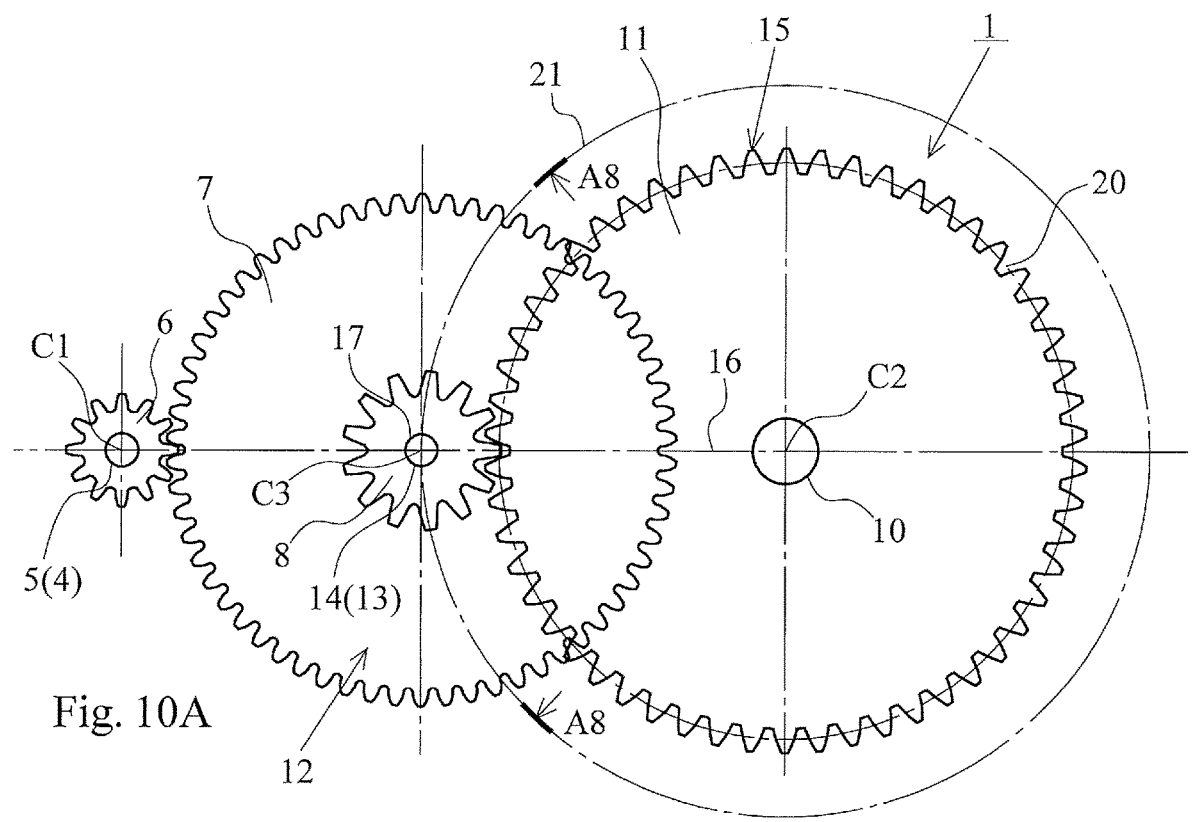
FIGS. 10A and 10B illustrate a fourth assembly step of the gear device according to the second embodiment of the present invention, with FIG. 10A being a plan view transparently illustrating the two-step gear and the second spur gear of the gear device while the cover is omitted, and FIG. 10B being a cross-sectional view of the gear device taken along a line A8-A8 in FIG. 10A.
Figure 10B:
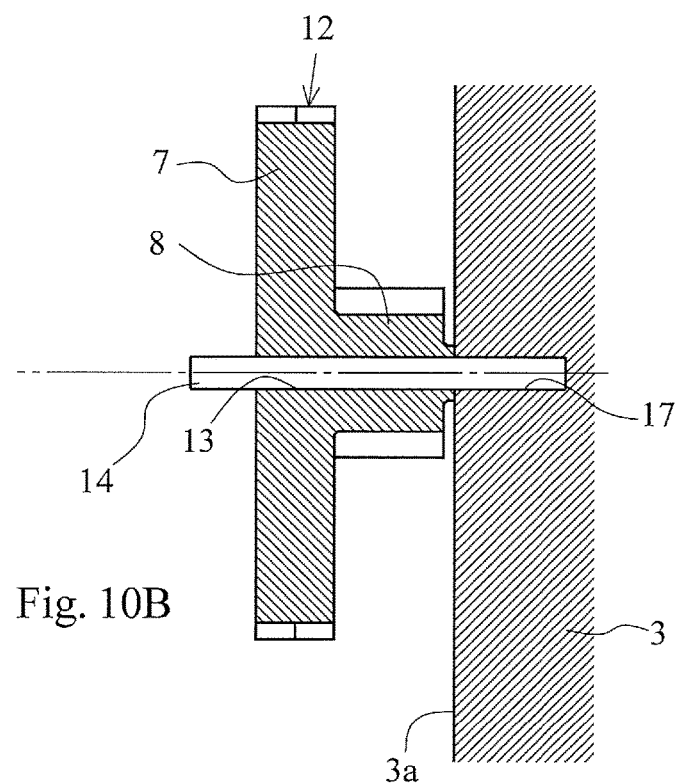
Figure 11A:
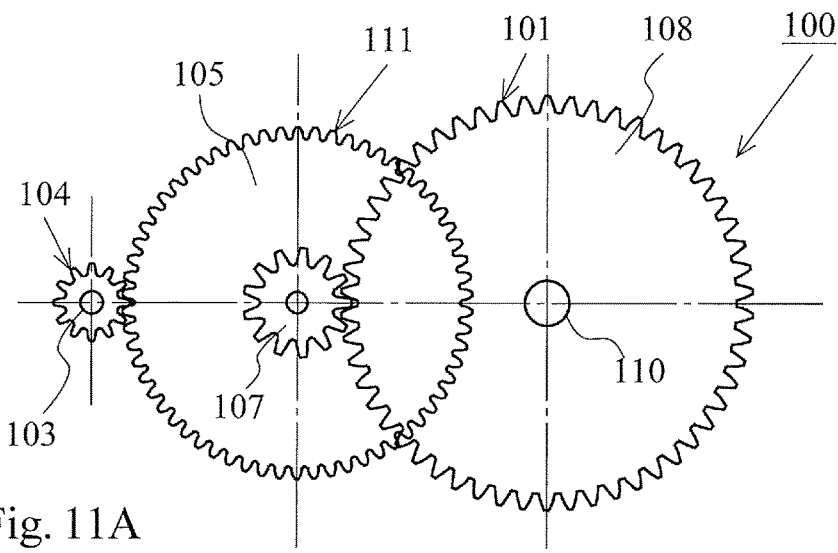
FIGS. 11A and 11B illustrate a gear device as a development target, with FIG. 11A being a plan view illustrating the gear device while a cover is removed, and FIG. 11B being a vertical cross-sectional view of the gear device.
Figure 11B:
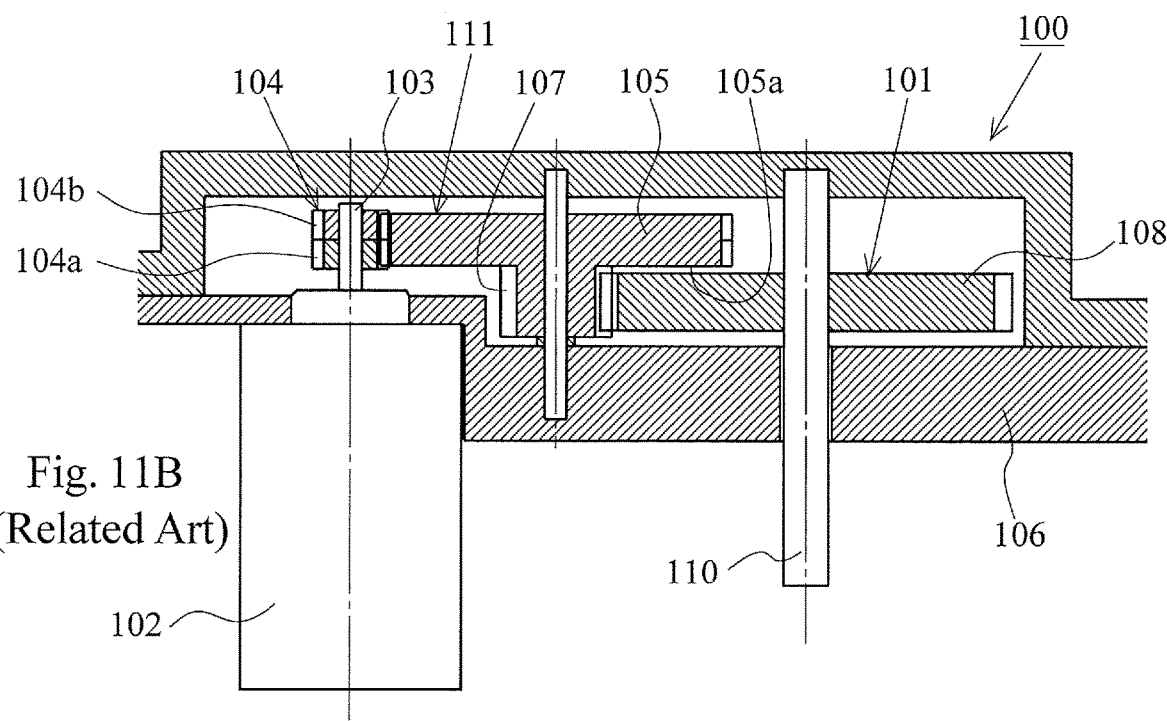
Figure 12A:
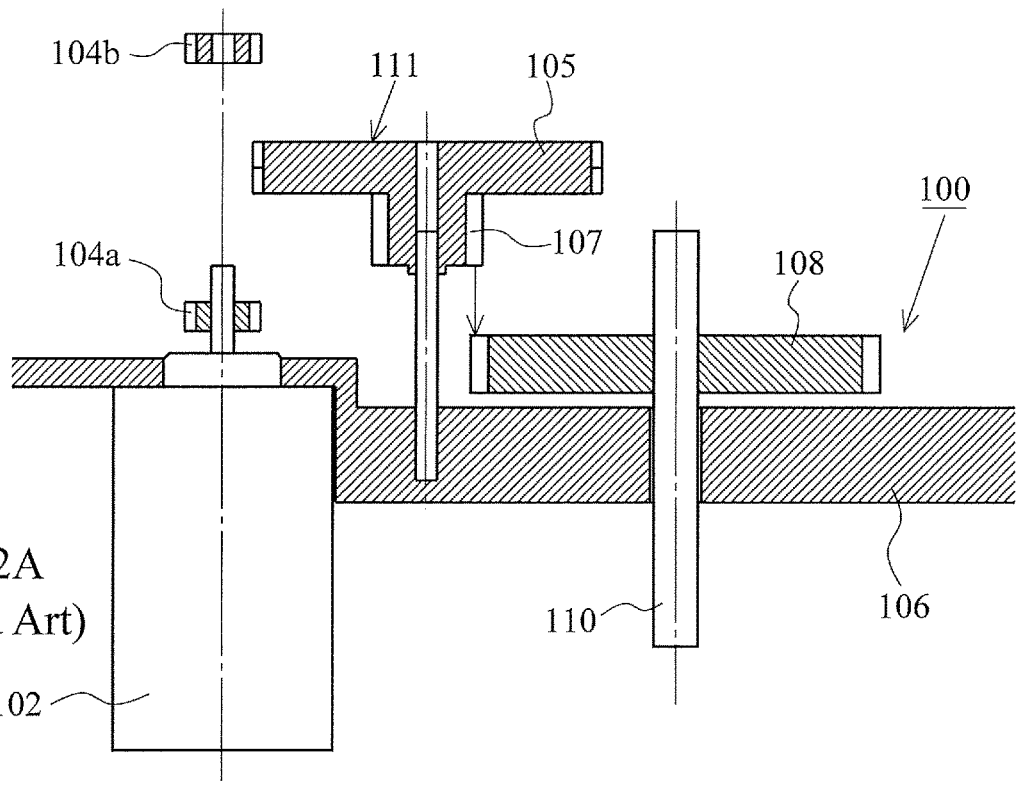
FIG. 12A illustrates a first assembled state of the gear device illustrated in FIG. 11.
Figure 12B:
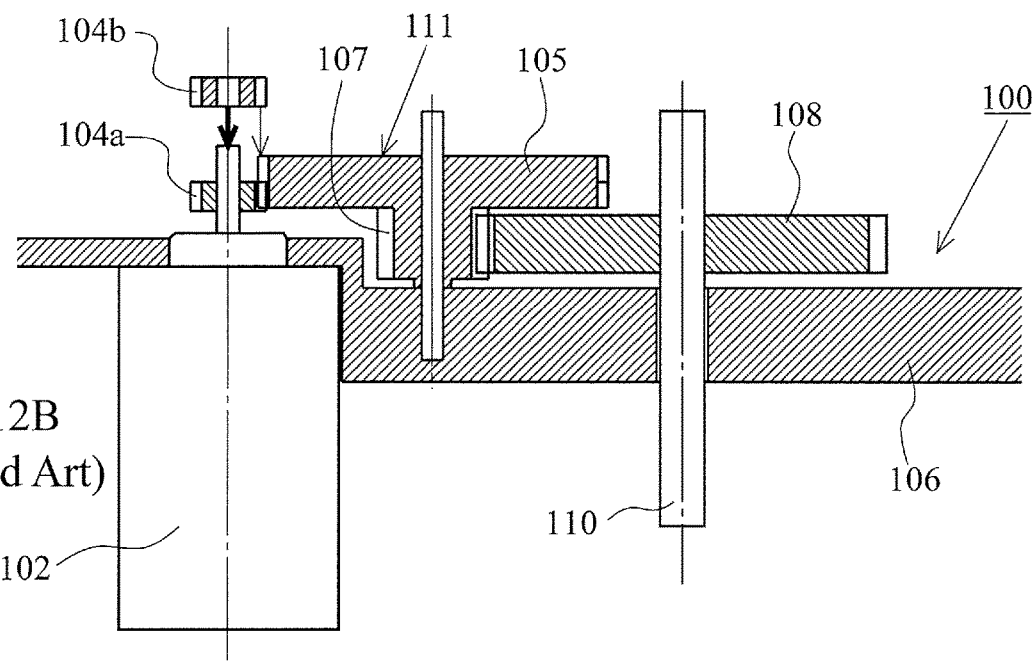
FIG. 12B illustrates a second assembled state of the gear device illustrated in FIG. 11.

FIG. 10 includes drawings illustrating a fourth assembly step of the gear device 1 according to the embodiment. FIG. 10A is a plan view illustrating the gear device 1 while the cover 2 is omitted, and a drawing transparently illustrating the two-step gear 12 and the second spur gear 11. FIG. 10B is a cross-sectional view of the gear device 1 taken along a line A8-A8 in FIG. 10A.

In this fourth assembly step of the gear device 1 illustrated in FIG. 10, the two-step gear 12 and the intermediate shaft 14 in the third assembly step are moved in the direction along the pitch circle 20 of the second spur gear 11 and the direction toward the shaft support hole 17, thus the intermediate shaft 14 is freely dropped into the shaft support hole 17. At this time, the first spur gear 8 of the two-step gear 12 is meshed with the second spur gear 11, the second double helical gear 7 of the two-step gear 12 is meshed with the first double helical gear 6, thus the rotational center (the shaft center C3 of the intermediate shaft 14) of the two-step gear 12 moves along the virtual circle 21 concentric to the pitch circle 20 of the second spur gear 11. Accordingly, the first double helical gear 6, the two-step gear 12 (the second double helical gear 7, the first spur gear 8), and the second spur gear 11 are meshed at a desired mesh position (a mesh position where the rotational center of the first double helical gear 6, the rotational center of the two-step gear 12, and the rotational center of the second spur gear 11 are positioned on the straight line 16), thus the rotation of the rotation shaft 5 of the motor 4 is smoothly transmitted to the output shaft 10 via the first double helical gear 6, the two-step gear 12, and the second spur gear 11.

(Effect of Second Embodiment)

As described above, with the method for assembling the gear device 1 according to the embodiment, simply meshing the first spur gear 8 of the two-step gear 12 with the second spur gear 11 and moving the two-step gear 12 and the intermediate shaft 14 in the direction along the pitch circle 20 of the second spur gear 11 and the direction toward the shaft support hole 17 while maintaining the meshing state of the first spur gear 8 with the second spur gear 11 ensure meshing the second double helical gear 7 of the two-step gear 12 with the first double helical gear 6 and smoothly moving the intermediate shaft 14 of the two-step gear 12 to the shaft support hole 17. As a result, the gear device 1 according to the embodiment ensures easy assembling of the first double helical gear 6 secured to the rotation shaft 5 of the motor 4 with the second double helical gear 7, which meshes with this first double helical gear 6, of the two-step gear 12, and easy assembling of the first spur gear 8 of the two-step gear 12 with the second spur gear 11 that meshes with this first spur gear 8.

Third Embodiment

The gear device according to the present invention may have a combination of a first helical gear (8) and a second helical gear (11) instead of the first spur gear 8 and the second spur gear 11 of the gear device 1 according to the above-described first and second embodiment. Such a method for assembling the gear device according to the third embodiment of the present invention is similar to the method for assembling the gear device 1 according to the above-described first and second embodiment. Accordingly, the gear device according to the embodiment can provide the effect similar to the effect of the gear device 1 according to the above-described first embodiment. The method for assembling the gear device according to the embodiment can provide the effect similar to the effect of the method for assembling the gear device 1 according to the above-described first and second embodiment.

DESCRIPTION OF REFERENCE SIGNS

1: Gear device
3: Housing
3a: Surface
4: Motor
5: Rotation shaft
6: First double helical gear
7: Second double helical gear
7a: Back surface
8: First spur gear
(8): First helical gear
10: Output shaft
11: Second spur gear
(11) Second helical gear
12: Two-step gear
13: Shaft hole
14: Intermediate shaft
17: Shaft support hole
18: Meshing guide groove
20: Pitch circle

The invention claimed is:
1. A gear device comprising:
a first double helical gear secured to a rotation shaft of a motor, the rotation shaft projecting from a housing;
a two-step gear including a second double helical gear and a first spur gear, the second double helical gear meshing with the first double helical gear, the first spur gear being integrally formed on a back surface side of the second double helical gear, the first spur gear being disposed between the back surface side of the second double helical gear and a surface of the housing;
a second spur gear secured to an output shaft such that the second spur gear meshes with the first spur gear at the back surface side of the second double helical gear; and
an intermediate shaft fitted to a shaft hole of the two-step gear, the intermediate shaft relatively rotatably and slidably movably supporting the two-step gear,
wherein the housing includes:
a shaft support hole housing one end side of the intermediate shaft fitted to the shaft hole of the two-step gear at a desired mesh position of the first double helical gear with the second double helical gear; and a meshing guide groove that meshes the second double helical gear with the first double helical gear by guiding the intermediate shaft fitted to the shaft hole of the two-step gear along a pitch circle of the second spur gear to a proximity of the shaft support hole while maintaining a state where the first spur gear meshes with the second spur gear, and wherein the meshing guide groove has a groove depth that decreases to the surface of the housing at the proximity of the shaft support hole.

2. The gear device according to claim 1, wherein a diameter of the second double helical gear is larger than a diameter of the first spur gear.

3. The gear device according to claim 1, wherein:
a shaft center of the rotation shaft, a shaft center of the intermediate shaft, and a shaft center of the output shaft are positioned in an identical straight manner, and the meshing guide groove is one of a pair of meshing guide grooves formed to have a straight line as a symmetry axis, the straight line connecting the shaft center of the rotation shaft to the shaft center of the output shaft.

4. A gear device comprising:
a first double helical gear secured to a rotation shaft of a motor, the rotation shaft projecting from a housing;

a two-step gear including a second double helical gear and a first helical gear, the second double helical gear meshing with the first double helical gear, the first helical gear being integrally formed on a back surface side of the second double helical gear, the first helical gear being disposed between the back surface side of the second double helical gear and a surface of the housing;

a second helical gear secured to an output shaft such that the second helical gear meshes with the first spur gear at the back surface side of the second double helical gear; and an intermediate shaft fitted to a shaft hole of the two-step gear, the intermediate shaft relatively rotatably and slidably movably supporting the two-step gear, wherein the housing includes:
a shaft support hole housing one end side of the intermediate shaft fitted to the shaft hole of the two-step gear at a desired mesh position of the first double helical gear with the second double helical gear; and a meshing guide groove meshing the second double helical gear with the first double helical gear by guiding the intermediate shaft fitted to the shaft hole of the two-step gear along a pitch circle of the second helical gear to a proximity of the shaft support hole while maintaining a state where the first helical gear meshes with the second helical gear, and wherein the meshing guide groove has a groove depth that decreases to the surface of the housing at the proximity of the shaft support hole.

5. The gear device according to claim 4, wherein a diameter of the second double helical gear is larger than a diameter of the first helical gear.

6. The gear device according to claim 4, wherein:
a shaft center of the rotation shaft, a shaft center of the intermediate shaft, and a shaft center of the output shaft are positioned in an identical straight manner, and the meshing guide groove is one of a pair of meshing guide grooves formed to have a straight line as a symmetry axis, the straight line connecting the shaft center of the rotation shaft to the shaft center of the output shaft.

7. A method for assembling a gear device, wherein the gear device includes:
a first double helical gear secured to a rotation shaft of a motor, the rotation shaft projecting from a housing;

a two-step gear including a second double helical gear and a first spur gear, the second double helical gear meshing with the first double helical gear, the first spur gear being integrally formed on a back surface side of the second double helical gear, the first spur gear being disposed between the back surface side of the second double helical gear and a surface of the housing;

a second spur gear secured to an output shaft such that the second spur gear meshes with the first spur gear at the back surface side of the second double helical gear; and an intermediate shaft fitted to a shaft hole of the two-step gear, the intermediate shaft relatively rotatably and slidably movably supporting the two-step gear, wherein the housing includes:
a shaft support hole housing one end side of the intermediate shaft fitted to the shaft hole of the two-step gear at a desired mesh position of the first double helical gear with the second double helical gear; and a meshing guide groove meshing the second double helical gear with the first double helical gear by guiding the intermediate shaft fitted to the shaft hole of the two-step gear along a pitch circle of the second spur gear to a proximity of the shaft support hole while maintaining a state where the first spur gear meshes with the second spur gear, wherein the meshing guide groove is formed to have a groove depth that decreases to the surface of the housing at the proximity of the shaft support hole, and wherein the method for assembling the gear device comprises:
meshing the first spur gear with the second spur gear and engaging the one end side of the intermediate shaft with the meshing guide groove;

subsequently moving the intermediate shaft with the two-step gear toward the shaft support hole along the meshing guide groove to mesh the second double helical gear of the two-step gear with the first double helical gear;

further moving the intermediate shaft with the two-step gear toward the shaft support hole to position the intermediate shaft at the proximity of the shaft support hole for causing the mesh of the second double helical gear with the first double helical gear to advance while maintaining the mesh of the first spur gear with the second spur gear; and subsequently moving the intermediate shaft with the two-step gear to above the shaft support hole and dropping the intermediate shaft into the shaft support hole.

8. A method for assembling a gear device, wherein the gear device includes:
a first double helical gear secured to a rotation shaft of a motor, the rotation shaft projecting from a housing;

a two-step gear including a second double helical gear and a first helical gear, the second double helical gear meshing with the first double helical gear, the first helical gear being integrally formed on a back surface side of the second double helical gear, the first helical gear being disposed between the back surface side of the second double helical gear and a surface of the housing;
a second helical gear secured to an output shaft such that the second helical gear meshes with the first helical gear at the back surface side of the second double helical gear; and
an intermediate shaft fitted to a shaft hole of the two-step gear, the intermediate shaft relatively rotatably and slidably movably supporting the two-step gear,
wherein the housing includes:
a shaft support hole housing one end side of the intermediate shaft fitted to the shaft hole of the two-step gear at a desired mesh position of the first double helical gear with the second double helical gear; and
a meshing guide groove meshing the second double helical gear with the first double helical gear by guiding the intermediate shaft fitted to the shaft hole of the two-step gear along a pitch circle of the second helical gear to a proximity of the shaft support hole while maintaining a state where the first helical gear meshes with the second helical gear,
wherein the meshing guide groove has a groove depth that decreases to the surface of the housing at the proximity of the shaft support hole, and
wherein the method for assembling the gear device comprises:
meshing the first helical gear with the second helical gear and engaging the one end side of the intermediate shaft with the meshing guide groove;
subsequently moving the intermediate shaft with the two-step gear toward the shaft support hole along the meshing guide groove to mesh the second double helical gear of the two-step gear with the first double helical gear;
further moving the intermediate shaft with the two-step gear toward the shaft support hole to position the intermediate shaft at the proximity of the shaft support hole for causing the mesh of the second double helical gear with the first double helical gear to advance while maintaining the mesh of the first helical gear with the second helical gear; and
subsequently moving the intermediate shaft with the two-step gear to above the shaft support hole and dropping the intermediate shaft into the shaft support hole.

9. A method for assembling a gear device, wherein the gear device includes:
a first double helical gear secured to a rotation shaft of a motor, the rotation shaft projecting from a housing;
a two-step gear including a second double helical gear and a first spur gear, the second double helical gear meshing with the first double helical gear, the first spur gear being integrally formed on a back surface side of the second double helical gear, the first spur gear being disposed between the back surface side of the second double helical gear and a surface of the housing;
a second spur gear secured to an output shaft such that the second spur gear meshes with the first spur gear at the back surface side of the second double helical gear; and
an intermediate shaft fitted to a shaft hole of the two-step gear, the intermediate shaft relatively rotatably and slidably movably supporting the two-step gear,
wherein the housing includes a shaft support hole housing one end side of the intermediate shaft fitted to the shaft hole of the two-step gear at a desired mesh position of the first double helical gear with the second double helical gear, and
wherein the method for assembling the gear device comprises:
meshing the first spur gear with the second spur gear;
subsequently, moving the two-step gear and the intermediate shaft fitted to the shaft hole of the two-step gear in a direction along a pitch circle of the second spur gear and a direction toward the shaft support hole, and meshing the second double helical gear of the two-step gear with the first double helical gear;
further moving the two-step gear and the intermediate shaft fitted to the shaft hole of the two-step gear in the direction along the pitch circle of the second spur gear and the direction toward the shaft support hole to position the intermediate shaft at a proximity of the shaft support hole for causing the mesh of the second double helical gear with the first double helical gear to advance while maintaining the mesh of the first spur gear with the second spur gear; and
subsequently moving the intermediate shaft with the two-step gear to above the shaft support hole and dropping the intermediate shaft into the shaft support hole.

10. A method for assembling a gear device, wherein the gear device includes:
a first double helical gear secured to a rotation shaft of a motor, the rotation shaft projecting from a housing;
a two-step gear including a second double helical gear and a first helical gear, the second double helical gear meshing with the first double helical gear, the first helical gear being integrally formed on a back surface side of the second double helical gear, the first helical gear being disposed between the back surface side of the second double helical gear and a surface of the housing;
a second helical gear secured to an output shaft such that the second helical gear meshes with the first spur gear at the back surface side of the second double helical gear; and
an intermediate shaft fitted to a shaft hole of the two-step gear, the intermediate shaft relatively rotatably and slidably movably supporting the two-step gear,
wherein the housing includes a shaft support hole housing one end side of the intermediate shaft fitted to the shaft hole of the two-step gear at a desired mesh position of the first double helical gear with the second double helical gear, and
wherein the method for assembling the gear device comprises:
meshing the first helical gear with the second helical gear;
subsequently, moving the two-step gear and the intermediate shaft fitted to the shaft hole of the two-step gear in a direction along a pitch circle of the second helical gear and a direction toward the shaft support hole, and meshing the second double helical gear of the two-step gear with the first double helical gear;
further moving the two-step gear and the intermediate shaft fitted to the shaft hole of the two-step gear in the direction along the pitch circle of the second helical gear and the direction toward the shaft support hole to position the intermediate shaft at a proximity of the shaft support hole for causing the mesh of the second double helical gear with the first double helical gear to advance while maintaining the mesh of the first helical gear with the second helical gear; and subsequently moving the intermediate shaft with the two-step gear to above the shaft support hole and dropping the intermediate shaft into the shaft support hole.

* * * * *